United States Patent [19]

Krent

[11] 4,262,919
[45] Apr. 21, 1981

[54] ARTICULATED BODY-STEERABLE SLED WITH ADD-ON MODULES

[76] Inventor: Edward D. Krent, 207 W. Eisenhower Dr., Sharon, Mass. 02067

[21] Appl. No.: 44,961

[22] Filed: Jun. 4, 1979

[51] Int. Cl.³ .............................................. B62B 13/08
[52] U.S. Cl. ........................................ 280/16; 280/22; 280/24
[58] Field of Search ................... 280/22, 12 R, 12 B, 280/12 E, 15, 16, 18, 19, 20, 21 R, 24, 408, 87.01; 16/150, DIG. 13

[56] References Cited

U.S. PATENT DOCUMENTS

| | | | |
|---|---|---|---|
| 119,611 | 10/1871 | Holtz | 280/15 |
| 294,883 | 3/1884 | Kirk | 280/15 |
| 464,927 | 12/1891 | Weicher | 280/24 |
| 2,219,905 | 10/1940 | Prickman | 280/12 B |
| 2,464,341 | 3/1949 | Ostlund | 280/12 B |
| 2,493,315 | 1/1950 | Ruka | 280/12 B |
| 2,826,423 | 3/1958 | Erickson | 280/12 B |
| 2,829,902 | 4/1958 | Stocker | 280/18 |
| 2,841,406 | 7/1958 | Brandon | 280/12 R |
| 2,927,799 | 3/1960 | Schnitzler | 280/18 |
| 2,971,767 | 2/1961 | Eaton | 280/12 B |
| 3,079,617 | 3/1963 | Brasch | 9/310 |
| 3,145,029 | 8/1964 | Ollanketo | 280/12 B |
| 3,199,887 | 8/1965 | McKelvey | 280/18 |
| 3,294,410 | 12/1966 | Tamasino, Jr. | 280/12 R |
| 3,414,284 | 12/1968 | Rosekrans, Jr. | 280/21 R |
| 3,512,195 | 5/1970 | Porsche | 9/310 |
| 3,600,000 | 8/1971 | Bergstrom | 280/18 |
| 3,603,419 | 9/1971 | Riddle | 280/18 |
| 3,635,490 | 1/1972 | Demaree | 280/18 |
| 3,705,730 | 12/1972 | Bergsland | 280/24 |
| 3,737,172 | 6/1973 | Clement | 280/22 |
| 3,773,342 | 11/1973 | Petrik | 280/12 H |
| 3,884,490 | 5/1975 | Hellman | 280/18 |
| 3,937,482 | 2/1976 | Johnson | 280/18 |
| 4,028,761 | 6/1977 | Taylor | 280/18 |

FOREIGN PATENT DOCUMENTS

| | | | |
|---|---|---|---|
| 1505768 | 5/1969 | Fed. Rep. of Germany | 280/12 B |
| 2163070 | 6/1973 | Fed. Rep. of Germany | 280/22 |
| 1040941 | 9/1966 | United Kingdom | 280/19 |

*Primary Examiner*—David M. Mitchell
*Attorney, Agent, or Firm*—Weingarten, Maxham & Schurgin

[57] ABSTRACT

An articulated, body-steerable sled, particularly useful as a child's recreational sled, provides the user with a high level of protection against pinching and collision. In a preferred embodiment, the sled comprises two or more sled body units flexibly coupled together by a hinge. A cover plate locks over the hinge to hold it in position and covers the region between the two units to protect the user from pinching. Contoured portions in the sled body units permit the user to steer the sled with his body and, at the same time, protect his body against collision.

20 Claims, 9 Drawing Figures

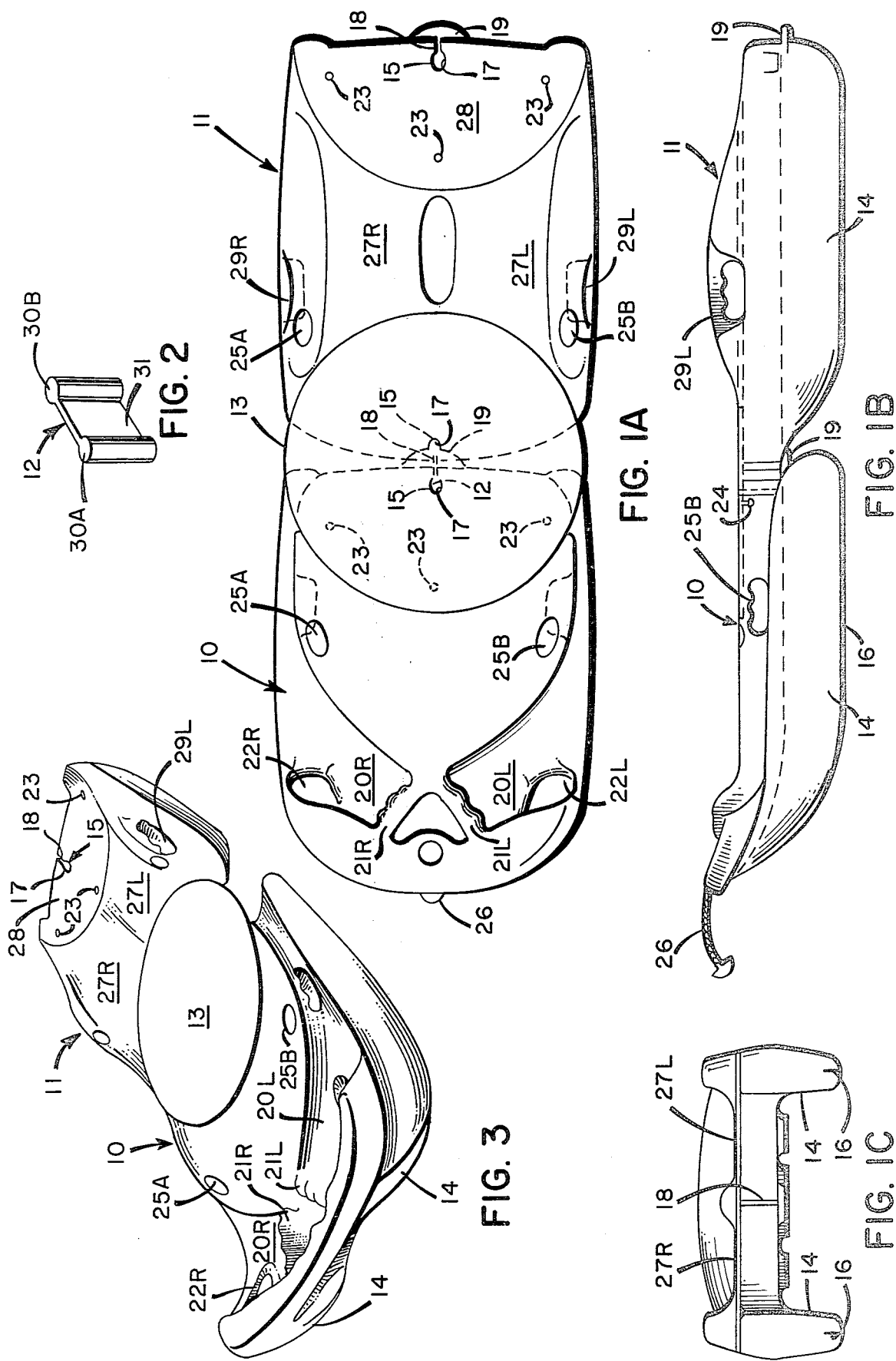

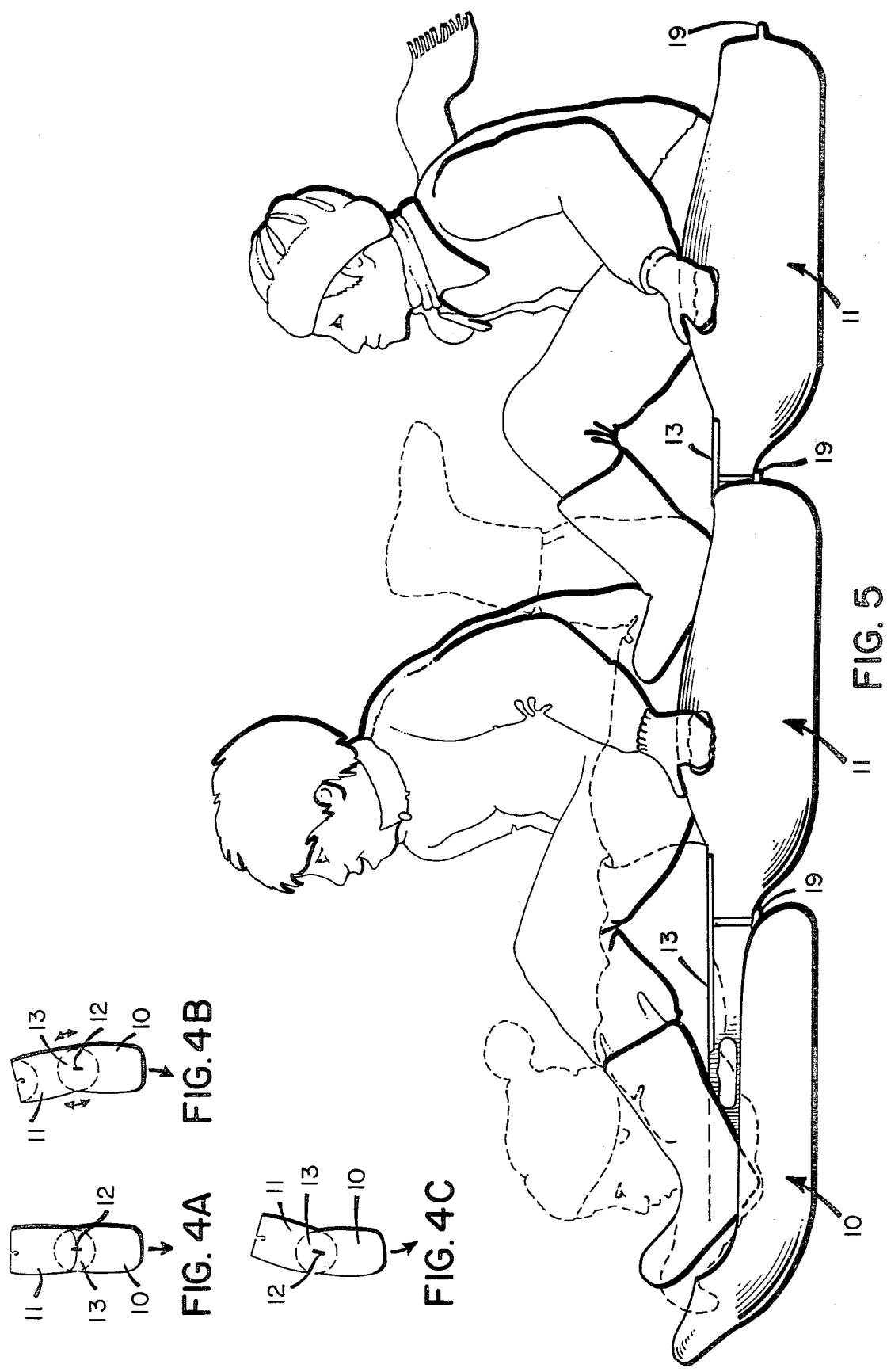

ARTICULATED BODY-STEERABLE SLED WITH ADD-ON MODULES

FIELD OF THE INVENTION

This invention relates to an improved recreational sled. More particularly, it relates to an articulated, body-steerable sled which provides a user with a high level of protection against pinching and collision.

BACKGROUND OF THE INVENTION

Steering has always been a problem in recreational sledding. The tranditional recreational sled, which is provided with a pair of metal runners connected to a pivotal steering cross bar, is steered by the using of the strength of the arms to turn the steering cross bar and thereby to warp the runners. The difficulty with this approach is that it provides only minimal directional control. The runners are hard to warp and rare indeed is the child who has sufficient arm strength to obtain adequate control on a crowded slope.

Alternative steering arrangements, such as those exemplified by U.S. Pat. No. 3,414,284 issued to J. N. Rosekrans, Jr., et al, utilize drag or breaking devices secured to opposite sides of the sled. To turn the sled in a given direction, the user merely applies a drag force on the appropriate side of the sled. The difficulty with this approach, however, is that directional control is achieved only at the expense of speed. In typical snow conditions on all but the steepest hills, this loss of speed is unacceptable to most children. Furthermore, many such steering arrangements are dependent on arm strength which, as mentioned, is deficient in small children.

Yet a further approach, such as that illustrated in U.S. Pat. No. 3,635,490, involves the use of diverging curved runners. Steering is effected by leaning in the direction desired, thereby placing more weight on the runner diverging in that direction. But the diverging runners necessarily slow down the sled, as compared with parallel runner sleds, even when the course is straight. Moreover, while such sleds may be steered by a child in the sitting position, it is highly difficult to control them in the prone position because of the difficulty of generating the requisite torque while lying down.

SUMMARY OF THE INVENTION

In accordance with the invention a recreational sled is articulated and provided with a cover plate and contoured control surfaces so that is can be steered by the full strength of the user's body. In a preferred embodiment, the sled comprises two or more sled body components flexibly coupled together by a hinge. A circular cover plate locks over the hinge to hold it in position and to protect the user's extremities and clothing from pinching as the sled body units flex laterally in relation to one another. Contoured portions in the sled body units permit the user to steer the sled with his body and, at the same time, confine his extremities within the sled in order to protect them against collision.

BRIEF DESCRIPTION OF THE DRAWINGS

The nature, advantages, and various additional features of the invention will appear more fully upon consideration of the illustrative embodiments now to be described in detail in connection with the accompanying drawings.

In the drawings:

FIGS. 1A, 1B and 1C are top, side and rear views of a preferred embodiment of a sled in accordance with the invention.

FIG. 2 is a perspective view illustrating the form of a preferred hinge for use in the embodiment of FIG. 1.

FIG. 3 is a perspective view of the embodiment of FIG. 1.

FIGS. 4A, 4B and 4C are simplified top view of sleds going straight, turning right and turning left, respectively, and;

FIG. 5 is a schematic side view showing the use of the sled with an additional seating module added on.

For convenience of reference, the same structural elements are given the same reference numerals throughout the drawings.

DETAILED DESCRIPTION OF THE DRAWINGS

Referring to the drawings, FIGS. 1A, 1B and 1C are top, side and rear views, respectively, of a preferred embodiment of a sled in accordance with the invention. In essence the sled comprises four components: a front sled body unit 10, a rear sled body unit 11, a hinge member 12 for flexibly coupling the front and rear units, and a cover plate 13 locking over hinge 12 to hold the hinge in position and covering the region between the front and rear units 10 and 11 to protect a user of the sled against pinching of his body or clothing as the sled body units flex laterally in relation to one another.

Preferably each of the sled body units 10 and 11 comprises a molded plastic body including one or more running surfaces, such as respective pairs of runners 14, for sliding over snow or ice. One or more hinge receptacles 15 are formed for receiving a flexible hinge member 12, and contoured control surfaces are provided for permitting the user to steer the sled with his body and for protecting his body against collision. Advantageously runners 14 are provided with T-shaped steel inserts 16 for enhanced speed and durability.

The hinge receptacles 15 are dimensioned and adapted for receiving flexible hinge 12, the form of which is better illustrated in FIG. 2. In essence each receptacle includes an enlarged portion 17 for receiving an enlarged end portion of the hinge and a narrow neck 18 for longitudinally locking the hinge in position. Preferably the enlarged portion 17 is elongated in the longitudinal direction to a dimension 50 to 100% longer than the hinge in order to permit some vertical flexure between the front and rear sled units. One of the sled body units, here the front unit 10, preferably includes a horizontally projecting retainer tongue 19 to support the bottom of hinge 12 and to assure vertical interlock of the front and rear units when they are coupled together. This interlock keeps the rear unit from being forced down into the snow when the front unit encounters a bump.

The front body unit 10 preferably comprises a plurality of contoured surfaces dimensioned and adapted for receiving and protecting the body of the user and for permitting the user to control the lateral direction of the front unit with respect to the back unit. Specifically, as best shown in FIG. 3, recessed portions 20R and 20L are contoured for receiving the right and left arms, respectively, of a prone user within the vertical confines of the front unit. Vertically projecting surfaces 21R and 21L are advantageously contoured for providing right and left hand grips within the unit; and, conveniently, recessed portions 22R and 22L are contoured for receiving within the confines of the unit the right and left feet of a user alternatively in a seated position. The manner in which the body fits within these contoured surfaces will become clearer by reference to FIG 5. showing the sled in use.

Front unit 10 also advantageously includes one or more locking apertures 23 for receiving and engaging locking studs 24 from plate 13. It can also include molded thumb and finger depressions 25A and 25B to facilitate hand carrying, and an aperture for a pull rope 26.

Rear unit 11 also includes contoured control surfaces in the form of recessed regions 27R and 27L contoured to receive the right and left legs, respectively, and recessed region 28 contoured to receive the hips, all within the confines of the unit. Recessed regions 29R and 29L are contoured to provide grips within the unit for the right and left hands of a seated user.

Rear unit 11 advantageously includes two receptacles 15 similar to the one described in relation to front unit 10, however, only the back of the rear unit includes a retainer tongue 19. The function of the back receptacle and retainer tongue is to permit the user to optionally couple onto unit 11 an additional similar unit, such as is shown in FIG. 5. With this structure any number of rear units 11 can be added on to the sled.

The form of the preferred hinge 12 is shown in FIG. 2. This hinge is preferably made of a flexible, fatigue-resistant plastic such as polypropylene and advantageously has a dumbell or "dogbone" shaped cross section with a pair of enlarged end portions 30A and 30B connected together by a narrower neck portion 31. In coupling together sled body units 10 and 11, one enlarged end portion, e.g. 30A is inserted into the receptacle 15 of unit 10 and the other enlarged end 30B is inserted into the adjacent receptacle of unit 11. Specifically, the enlarged ends of the hinge are inserted into the enlarged portions 17 of the receptacles and the neck portion of the hinge is inserted into the neck portions 18 of the receptacles. The hinge is supported from below by the horizontally projecting retainer tongue 19, and it is locked in from above by cover plate 13. In this position, the hinge operates to flexibly couple the two units together in the longitudinal direction while permitting lateral flexure for steering and some vertical flexure to accomodate bumps and moguls.

The cover plate 13 is advantageously a circular plate substantially covering the hinge 12 and the region between sled body units 10 and 11. The plate is preferably provided with locking means for locking onto one of the body units while permitting relative lateral movement of the other. This locking may be effected by providing locking studs 24 dimensioned and spaced for locking into apertures 23 in front unit 10. Advantageously both the front and rear units include semicircular recessed portions (not shown) dimensioned for receiving circular plate 13 flush with the unit surfaces. The cover plate functions to retain the hinge 12 in operative position and to prevent the user's body and clothing from entering the region between units 10 and 11 where it might be pinched.

The technique for steering and using the sled can now be readily understood by reference to FIGS. 4 and 5. As can be seen in FIG. 5, whether prone or seated, the user is in a position to use the contoured control surfaces to control the relative lateral position of the front and rear units. In the prone position, with his arms, legs, and hands in the appropriate contoured surfaces, the user can turn the front unit in relation to the rear unit by flexing his torso. In the alternative seated position with his feet in the appropriate recesses, he need merely move his legs to turn the front unit. To go straight, the user need merely keep the front and rear units in line, as shown in FIG. 4A. To turn right, he need merely turn the front unit to the right as shown in FIG. 4B, and to go left he need only turn the front to the left as shown in FIG. 4C.

As further illustrated in FIG. 5, one important advantage of the sled is that additional rear units similar to unit 11 can be added on to the basic two unit sled to form a sled of three or more units.

It is contemplated that the front and rear units of the sled will be separately integrally molded of low friction, durable plastic material such as ABS plastic, polyethylene or polyurethane by a conventional molding techniques such as rotational casting or foam molding. The cover plate 13 is preferably made of injection molded polyethylene, and the hinge 12 are preferably extruded of polypropylene. While the precise dimensions are not believed to be critical, the preferred embodiment utilizes units each approximately 50 cm in length by 37 cm. in width. The preferred cover plate is a 0.5 cm. thick circular plate approximately 37 cm. in diameter. The maximum height of each unit is approximately 16 cm., and the runners extend approximately 7.5 cm. below the undersides of the body units. The preferred hinges have a total length of approximately 7.5 cm. with 12 mm. diameter enlarged ends, a 3-5 mm. thick neck and a vertical height of 4 cm.

The sled has many advantages in use. The sled is highly steerable even by a child because the major muscles of the body can be used to quickly change direction. Steering can be effected quickly without prolonged drag killing the speed on mild slopes. In addition, the sled provides the user with a high level of protection against pinching and collision.

While the invention has been described in connection with preferred specific embodiment, it should be understood that this embodiment is merely illustrative of the many possible specific embodiments which can represent applications of the principles of the invention. Numerous and varied devices can be made by those skilled in the art without departing from the spirit and scope of the invention.

What is claimed is:

1. A sled for sliding over snow and ice which is body-steerable in both seated and prone positions comprising:
   a rigid front sled body unit including one or more running surfaces for sliding over snow and ice and, all within the vertical confines of said front unit, a pair of recessed portions contoured for receiving the arms of a user in the prone position, a pair of projecting portions contoured for providing grips for the hands of a user in the prone position, and a pair of recessed portions contoured for receiving the feet of a user in the seated position;
   a rigid rear sled body unit including one or more running surfaces and, all within the vertical confines of said rear unit, a pair of recessed portions contoured for receiving the legs of user in the prone position, a pair of portions contoured for providing grips for the hands of a user in the seated position and a portion contoured for receiving the hips of a user in the seated position;

hinge means for flexibly coupling said front sled body unit to said rear sled body unit in such a manner that said front unit can be turned laterally in relation to said rear unit; and plate means substantially covering the region between said front unit and said rear unit to protect a user of said sled against pinching.

2. A sled according to claim 1 wherein said front unit includes one or more plate locking apertures and said plate means comprises a circular plate including one or more locking studs dimensioned and spaced for lockably engaging said locking apertures.

3. A sled according to claim 1 wherein said hinge means comprises an elongated member of flexible material having a pair of ends and said front and rear units comprise means for lockably engaging opposite ends of said elongated member.

4. A sled according to claim 1 wherein said hinge means comprises a member of flexible material having a pair of enlarged portions connected together by a narrower neck portion and said front and rear units comprise receptacle means for receiving and lockably engaging respective ones of said enlarged portions.

5. A sled according to claim 1 wherein said hinge means comprises a member of flexible material having a pair of enlarged portions connected together by a narrower neck portion and said front and rear units comprise receptacle means including portions enlarged as compared to the enlarged portions of said hinge member but elongated along the front-to-rear axis of the sled, for lockably engaging respective ones of said enlarged portions of said hinge while permitting lateral and vertical flexure.

6. A sled according to claim 1 wherein said front unit further comprises retainer tongue means projecting horizontally beneath said rear unit for insuring vertical interlock when said units are coupled together.

7. A sled according to claim 1 wherein:
said hinge means comprises a member of flexible material having a pair of enlarged portions connected together by a narrower neck portion;
said front and rear units comprise receptacle means for receiving and lockably engaging respective ones of said enlarged portions; and
said plate means locks over said receptacle means, locking said hinge means therein.

8. A sled according to claim 1 wherein said front and rear sled body units each comprise a pair of substantially parallel running surfaces.

9. A sled according to claim 1 including one or more additional units similar to said rear sled body unit flexibly coupled thereto.

10. A sled according to claim 1 wherein said plate means comprises a circular plate.

11. In a sled for sliding over snow and ice of the type comprising a front sled body unit including one or more running surfaces for sliding over snow and ice; a rear sled body unit including one or more running surfaces; hinge means for flexibly coupling said front sled body unit to said rear sled body unit in such a manner that said front unit can be turned laterally in relation to said rear unit; and plate means substantially covering the region between said front unit and said rear unit to protect a user of said sled against pinching, the improvement wherein:
said hinge means comprises an elongated member of flexible material having a pair of ends and said front and rear units comprise means for lockably engaging opposite ends of said elongated member.

12. A sled according to claim 11 wherein said front and rear sled body units further comprise contoured control surfaces for assisting a user in steering the sled by turning the front unit laterally with respect to the rear unit.

13. In a sled for sliding over snow and ice of the type comprising a front sled body unit incuding one or more running surfaces for sliding over snow and ice; a rear sled body unit including one or more running surfaces; hinge means for flexibly coupling said front sled body unit to said rear sled body unit in such a manner that said front unit can be turned laterally in relation to said rear unit; and plate means substantially covering the region between said front unit and said rear unit to protect a user of said sled against pinching, the improvement wherein:
said hinge means comprises a member of flexible material having a pair of enlarge portions connected together by a narrower neck portion and said front and rear units comprise receptacle means for receiving and lockably engaging respective ones of said enlarged portions.

14. A sled according to claim 13 wherein said front and rear sled body units further comprise contoured control surfaces for assisting a user in steering the sled by turning the front unit laterally with respect to the rear unit.

15. In a sled for sliding over snow and ice of the type comprising a front sled body unit including one or more running surfaces for sliding over snow and ice; a rear sled body unit including one or more running surfaces; hinge means for flexibly coupling said front sled body unit to said rear sled body unit in such a manner that said front unit can be turned laterally in relation to said rear unit; and plate means substantially covering the region between said front unit and said rear unit to protect a user of said sled against pinching, the improvement wherein:
said hinge means comprises a member of flexible material having a pair of enlarged portions connected together by a narrower neck portion and said front and rear units comprise receptacle means including portions enlarged as compared to the enlarged portions of said hinge member but elongated along the front-to-rear axis of the sled, for lockably engaging respective ones of said enlarged portions of said hinge while permitting lateral and vertical flexure.

16. A sled according to claim 15 wherein said front and rear sled body units further comprise contoured control surfaces for assisting a user in steering the sled by turning the front unit laterally with respect to the rear unit.

17. In a sled for sliding over snow and ice of the type comprising a front sled body unit including one or more running surfaces for sliding over snow and ice; a rear sled body unit including one or more running surfaces; hinge means for flexibly coupling said front sled body unit to said rear sled body unit in such a manner that said front unit can be turned laterally in relation to said rear unit; and plate means substantially covering the region between said front unit and said rear unit to protect a user of said sled against pinching, this improvement wherein:

said hinge means comprises a member of flexible material having a pair of enlarged portions connected together by a narrower neck portion;

said front and rear units comprise receptacle means for receiving and lockably engaging respective ones of said enlarged portions; and said plate means locks over said receptacle means, locking said hinge means therein.

18. A sled according to claim 17 wherein said front and rear sled body units further comprise contoured control surfaces for assisting a user in steering the sled by turning the front unit laterally with respect to the rear unit.

19. A sled for sliding over snow and ice of the type comprising a front sled body unit including one or more running surfaces for sliding over snow and ice; a rear sled body unit including one or more running surfaces; hinge means for flexibly coupling said front sled body unit to said rear sled body unit in such a manner that said front unit can be turned laterally in relation to said rear unit; and plate means substantially covering the region between said front unit and said rear unit to protect a user of said sled against pinching, the improvement wherein:

said front unit includes one or more plate locking apertures and said plate means comprises a circular plate including one or more locking studs dimensioned and spaced for lockably engaging said locking apertures.

20. A sled according to claim 19 wherein said front and rear sled body units further comprise contoured control surfaces for assisting a user in steering the sled by turning the front unit laterally with respect to the rear unit.

* * * * *